(12) United States Patent
Chang et al.

(10) Patent No.: US 11,572,307 B1
(45) Date of Patent: Feb. 7, 2023

(54) PROCESS FOR MODIFYING STEEL SLAG THROUGH ACIDIFICATION AND CARBONIZATION COUPLING

(71) Applicants: SHANDONG UNIVERSITY, Shandong (CN); QINGDAO DANENG ENVIRONMENTAL PROTECTION EQUIPMENT CO., LTD., Shandong (CN); QINGDAO HAITAI ENERGY SCIENCE AND TECHNOLOGY RESEARCH INSTITUTE, Shandong (CN)

(72) Inventors: Jingcai Chang, Qingdao (CN); Yong Wang, Qingdao (CN); Xiaojie Liang, Qingdao (CN); Peng Wang, Qingdao (CN); Shusheng Li, Qingdao (CN); Chunyuan Ma, Qingdao (CN); Yanhui Liu, Qingdao (CN)

(73) Assignees: SHANDONG UNIVERSITY, Qingdao (CN); QINGDAO DANENG ENVIRONMENTAL PROTECTION EQUIPMENT CO., LTD., Qingdao (CN); QINGDAO HAITAI ENERGY SCIENCE AND TECHNOLOGY RESEARCH INSTITUTE, Qingdao (CN)

( * ) Notice: Subject to any disclaimer, the term of this patent is extended or adjusted under 35 U.S.C. 154(b) by 0 days.

(21) Appl. No.: 17/845,175

(22) Filed: Jun. 21, 2022

(30) Foreign Application Priority Data

Nov. 24, 2021 (CN) .......................... 2021114075427

(51) Int. Cl.
C04B 7/17 (2006.01)
C21C 7/00 (2006.01)
C04B 5/06 (2006.01)
C04B 18/14 (2006.01)

(52) U.S. Cl.
CPC .................. C04B 7/17 (2013.01); C04B 5/06 (2013.01); C04B 18/142 (2013.01); C21C 7/0087 (2013.01)

(58) Field of Classification Search
CPC ........... C04B 7/17; C04B 5/06; C04B 18/142; C21C 7/0087
See application file for complete search history.

(56) References Cited

FOREIGN PATENT DOCUMENTS

| CN | 101134155 A | 3/2008 |
| CN | 102343199 A | 2/2012 |
| CN | 103111186 A | 5/2013 |
| CN | 103771780 A | 5/2014 |
| CN | 103992054 A | 8/2014 |
| CN | 106540525 A | 3/2017 |
| CN | 112321180 A | 2/2021 |
| JP | S53-39297 A | 4/1978 |
| JP | 2005-074310 A | 3/2005 |

Primary Examiner — Anthony J Green
(74) Attorney, Agent, or Firm — Oliff PLC

(57) ABSTRACT

The present invention belongs to the technical field of metallurgical solid waste resource utilization, and particularly relates to acidification and carbonization coupling modified steel slag as well as a preparation process and an application thereof. The process specifically includes the following steps of adopting acetic acid, tributyl phosphate, ethanolamine and a NaOH and $Ca(OH)_2$ emulsion as reaction reinforcing agents, and modifying the steel slag together with $CO_2$-rich lime kiln flue gas. The process for modifying the steel slag through acidification and carbonization coupling provided in the present invention has the advantages of simple reaction conditions and no need of high-pressure $CO_2$, additionally, the carbonation reaction rate can be greatly increased, and f-CaO and f-MgO in the steel slag can be effectively eliminated.

4 Claims, 2 Drawing Sheets

US 11,572,307 B1

PROCESS FOR MODIFYING STEEL SLAG THROUGH ACIDIFICATION AND CARBONIZATION COUPLING

TECHNICAL FIELD

The present invention belongs to the technical field of metallurgical solid waste resource utilization, and particularly relates to acidification and carbonization coupling modified steel slag as well as a preparation process and an application thereof.

BACKGROUND

The disclosure of the information in the background only aims to increase understanding of the general background of the present invention, but does not need to be deemed to acknowledge or imply in any form that the information structure has become the well-known prior art to general technicians in the field.

Steel production is one of the main industries emitting $CO_2$, according to the principle of mineral carbonation, steel slag is subjected to carbonation pretreatment by using $CO_2$-rich flue gas of a lime kiln, not only is the carbon sequestration effect achieved, but also the performance of the steel slag is improved. The direct carbonation reaction of the steel slag is mainly adopted in current research and has the following problems: (1) reaction conditions are strict, and a high $CO_2$ pressure is required; and (2) the carbonation reaction rate is low, f-CaO and f-MgO in the steel slag cannot be effectively eliminated through the carbonation reaction, thus, the carbonation technique of the steel slag is not popularized or applied, and the comprehensive treatment problem of the steel slag becomes more and more serious.

SUMMARY

In order to overcome the defects of the prior art, the present invention provides acidification and carbonization coupling modified steel slag as well as a preparation process and an application thereof. On the basis that the current air quenching treatment process of the steel slag has a controllable particle size, and the shape of steel slag particles is spherical with smooth surfaces, a new technique is developed, the steel slag is subjected to acidification and carbonization coupling treatment, and various reaction reinforcing agents are added, so that the alkali elimination reaction and the carbonation reaction of f-CaO and f-MgO in the steel slag are accelerated.

The first aspect of the present invention provides a process for modifying the steel slag through acidification and carbonization coupling, and the process specifically includes the following steps of adopting acetic acid, tributyl phosphate, ethanolamine and a NaOH and $Ca(OH)_2$ emulsion as reaction reinforcing agents, and modifying the steel slag together with $CO_2$-rich flue gas of a lime kiln.

The second aspect of the present invention provides modified steel slag prepared by adopting the above process.

The third aspect of the present invention provides a device for modifying the steel slag through acidification and carbonization coupling, the device includes an acidification and carbonization coupling reaction unit, a liquid-solid separation unit and a distillation separation unit, and the acidification and carbonization coupling reaction unit, the liquid-solid separation unit and the distillation separation unit are sequentially connected.

The fourth aspect of the present invention provides an application of the modified steel slag to preparing asphalt and concrete aggregates and blending materials for various building materials.

One or more embodiments of the present invention have at least the following beneficial effects:

(1) The process for modifying the steel slag through acidification and carbonization coupling provided in the present invention has the advantages of simple reaction conditions and no need of high-pressure $CO_2$, additionally, the carbonation reaction rate can be greatly increased, and f-CaO and f-MgO in the steel slag can be effectively eliminated.

(2) A coupling technique of acidification and carbonization coupling pretreatment is adopted to modify steel slag particles, after treatment is performed by adopting the processing technique, the content of f-CaO can be reduced to be less than 1.5%, and the volume stability problem is eliminated; and according to different application directions of products, the treatment time and the amount of the reaction reinforcing agents can be adjusted to control the extent of reaction on the surface of the steel slag, the hardness of the steel slag particles themselves is retained, additionally, the problem of bad volume stability caused by f-CaO and f-MgO is eliminated, and therefore, the steel slag can be used as asphalt and concrete aggregates or concrete aggregates for roads.

At present, limestone and basalt resources are in shortage, the current price is about 130 (including tax and freight) yuan per ton, the price of the steel slag is about 100 yuan per ton (including tax and freight) for accounting, and the benefit of slag per ton is $(130-100)*(100\%-13\%)=26.1$ yuan per ton.

BRIEF DESCRIPTION OF THE DRAWINGS

The accompanying drawings constituting a part of the present invention are used to provide a further understanding of the present invention. The exemplary embodiments of the present invention and descriptions thereof are used to explain the present invention, and do not constitute an improper limitation of the present invention.

DETAILED DESCRIPTION

Figure 1:
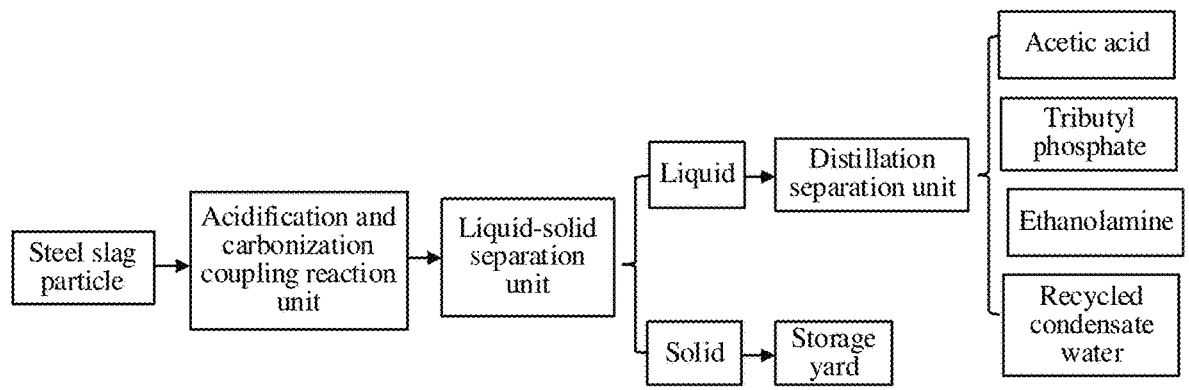
FIG. 1 is a flow diagram of the process for modifying the steel slag through acidification and carbonization coupling and a preparation method provided in the present invention.

It should be noted that, the following detailed descriptions are all exemplary, and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

As introduced in the background, the direct carbonation reaction of the steel slag is mainly adopted in current research and has the following problems: (1) reaction conditions are strict, and a high $CO_2$ pressure is required; and (2) the carbonation reaction rate is low, f-CaO and f-MgO in the steel slag cannot be effectively eliminated through the carbonation reaction, thus, the carbonation technique of the steel slag is not popularized or applied, and the comprehensive treatment problem of the steel slag becomes more and more serious.

In order to solve the above technical problem, the first aspect of the present invention provides a process for modifying steel slag through acidification and carbonization coupling, and the process specifically includes the following steps of adopting acetic acid, tributyl phosphate, ethanolamine and a NaOH and $Ca(OH)_2$ emulsion as reaction reinforcing agents, and processing the steel slag together with $CO_2$-rich flue gas of a lime kiln.

The acetic acid can accelerate the leaching rate of $Ca^{2+}$ and $Mg^{2+}$ in f-CaO and f-MgO in the steel slag; the ethanolamine can increase the solubility of $CO_2$ in the lime kiln flue gas (the solubility of $CO_2$ gas in the ethanolamine is 8.5 times that in a water solution); the tributyl phosphate can extract the acetic acid and promote the generation of $CaCO_3$, so that the carbonation reaction of the steel slag is accelerated; and the NaOH and $Ca(OH)_2$ emulsion is used for adjusting the PH value during carbonation, so that the reaction environment changes from acidity to alkalinity, and the carbonation reaction is promoted. The core of the scheme is that an "acidifying technique" is coupled with a "carbonation treatment technique", the two core processes are mutually promoted, the content of f-CaO and f-MgO in the steel slag is reduced, the volume stability problem of the steel slag is solved, and the air quenching treatment process of the steel slag is perfected.

In one or more implementations of the present invention, the specific steps include: sequentially adding water and acetic acid solid to steel slag, fully mixing and reacting, then introducing lime kiln flue gas containing $CO_2$ gas, and meanwhile, adding tributyl phosphate, a NaOH and $Ca(OH)_2$ emulsion and ethanolamine for acidification and carbonization coupling reaction.

Furthermore, the steel slag is preferably air quenched steel slag, because after liquid steel slag is subjected to air quenching treatment, the steel slag particle size is controllable, the average particle size is 2 mm, the acidification and carbonization coupling reaction is facilitated, but the steel slag needs to be subjected to rod milling treatment after being subjected to hot-smoldering treatment, the average particle size is 10 mm, the particle size is large, the reaction rate is low, and the acidification and carbonization coupling reaction is not facilitated.

Furthermore, when the water and the acetic acid solid are sequentially added to the steel slag, the water amount is controlled according to the liquid-solid ratio of 20:1 to 5:1, and the concentration of acetic acid is controlled to be 5% to 20%.

Furthermore, the mixing reaction time is 20-60 min.

Furthermore, the final total amount of the tributyl phosphate is the same as the molar mass of the added acetic acid.

Furthermore, the amount of the NaOH and $Ca(OH)_2$ emulsion is required to adjust the PH value of liquid between 8 and 11.

Furthermore, the total amount of the ethanolamine is 5% to 20%.

Furthermore, the acidification and carbonization coupling reaction time is controlled to be 15-30 min.

Furthermore, the flue gas pressure is controlled to be 0.1-2 MPa.

Furthermore, the reaction temperature is 25-100° C.

In the acidification and carbonization coupling process, the acetic acid in a solution erodes the surfaces of the steel slag particles and permeates into the steel slag, $Ca^{2+}$ and $Mg^{2+}$ are leached from f-CaO and f-MgO in the steel slag and a part of Ca in calcium silicate, meanwhile, $CO_2$ dissolves in water to generate $H_2CO_3$ which reacts with $Ca^{2+}$ and $Mg^{2+}$ to generate $CaCO_3$ and $MgCO_3$ so as to promote the reaction, and the reaction formulas are as follows:

$$f\text{-}CaO+H_2O \rightarrow Ca(OH)_2 \qquad (1)$$

$$f\text{-}MgO+H_2O \rightarrow Mg(OH)_2 \qquad (2)$$

$$CaSiO_3+2CH_3COOH \rightarrow Ca^{2+}+2CH_3COO^{-1}+SiO_2+H_2O \qquad (3)$$

$$Ca^{2+}+2CH_3COO^{-1}+CO_2+H_2O \rightarrow CaCO_3+2CH_3COOH \qquad (4)$$

$$Mg^{2+}+2CH_3COO^{-1}+CO_2+H_2O \rightarrow MgCO_3+2CH_3COOH \qquad (5)$$

$$R\text{—}NH_2+CO_2+H_2O \rightarrow R\text{-}NH_3^{+}+HCO_3^{-} \qquad (6)$$

$$NaOH+HCO_3^{-} \rightarrow Na+CO_3^{2-}+H_2O \qquad (7)$$

$$2Ca(OH)_2+2HCO_3^{-} \rightarrow 2CaCO_3+3H_2O \qquad (8)$$

The above reaction formulas show that the acidification reaction occurs in an acidic environment to eliminate f-CaO and f-MgO in the steel slag and generate calcium acetate, then the calcium acetate reacts with carbonic acid to generate calcium carbonate and acetic acid, then the acetic acid generated after reaction is extracted with the tributyl phosphate as an organic solvent so as to accelerate the carbonation reaction, and it can be seen that the acetic acid is only used as a catalyst in the reaction. But the carbonation reaction and the $CO_2$ dissolution occur in an alkaline environment, therefore, when the acetic acid is extracted with the tributyl phosphate, the ethanolamine which promotes the $CO_2$ dissolution can be added, and the NaOH and $Ca(OH)_2$ emulsion is added in batches to gradually adjust the PH value in the liquid to be 10 to 11 for the carbonation reaction. The adding time and the contents of the reaction reinforcing agents in the acidification and carbonization coupling process are controlled, so that the acidification and carbonization reaction process can be accelerated.

According to the present invention, the acetic acid, the tributyl phosphate, the ethanolamine and the NaOH and $Ca(OH)_2$ emulsion are used for performing acidification and carbonization coupling treatment on the steel slag particles, the treatment time and process are short, most of alkali in the steel slag can be eliminated, and the f-CaO content can be reduced to be less than 1.5%. The treatment time and the amount of the reaction reinforcing agents and the like can be adjusted according to the applications of treated products; if the microstructure and the particle strength of the steel slag particles need to be preferably retained, process parameters of short treatment time and small amount of the reaction reinforcing agents can be selected; and if Ca and Fe elements in the steel slag need to be completely separated, the treatment time is extended, and the amount of the reaction reinforcing agents is increased.

In one or more of implementations of the present invention, after the steel slag is modified through acidification and carbonization coupling, the modified steel slag is separated from liquid to be treated separately, the steel slag is cleaned with circulating water which is distilled to separate chemical agents, the steel slag is collected, the remaining solid containing suspension continues to be subjected to solid particle and liquid separation, separated solid is cleaned and collected, separated liquid is distilled, and obtained components are recycled.

The remaining solid containing suspension mainly includes $CaCO_3$, steel slag particles less than 1 mm, acetic acid, tributyl phosphate and ethanolamine. The above solid containing suspension continues to be subjected to solid and liquid separation, the remaining liquid includes acetic acid, ethanolamine and tributyl phosphate, the boiling point of the acetic acid is 117.9° C., the boiling point of the ethanolamine is 170.9° C., the boiling point of the tributyl phosphate is 288.28° C., therefore, according to different boiling points of three chemical substances, the three chemical substances can be separated by using a distillation separation column and then are recycled, the treatment cost of the technique is reduced, and the problem of environmental pollution is solved.

The second aspect of the present invention provides modified steel slag prepared by adopting the above process.

The third aspect of the present invention provides a device for modifying steel slag through acidification and carbonization coupling, the device includes an acidification and carbonization coupling reaction unit, a liquid-solid separation unit and a distillation separation unit, and the acidification and carbonization coupling reaction unit, the liquid-solid separation unit and the distillation separation unit are sequentially connected.

The steel slag particles pass through the liquid-solid separation unit to separate liquid and solid after being treated by the acidification and carbonization coupling reaction unit, the solid is conveyed to a storage yard for storage and standby application after being cleaned, the liquid passes through the distillation separation unit to separate acetic acid, tributyl phosphate, ethanolamine and return condensate water, waste water generated in all links of the process is treated and recycled, and substances harmful to the environment are not discharged in the process.

In one or more of implementations of the present invention, the acidification and carbonization coupling reaction unit includes a reaction chamber, a steel slag feed port, an exhaust port and a motor are formed in and arranged on the upper end of the reaction chamber, and an acetic acid feed port, a tributyl phosphate feed port, an ethanolamine feed port and a NaOH and $Ca(OH)_2$ emulsion feed port are further formed in the upper end of the reaction chamber.

Furthermore, the motor is connected with a stirring shaft with spiral blades, and the spiral blades are driven to rotate by virtue of the stirring shaft, so that materials in the reaction chamber are uniformly mixed.

Furthermore, uniformly distributed lime kiln flue gas nozzles and clear water flushing nozzles are arranged on the side surface of the reaction chamber.

Furthermore, a temperature sensor and a pressure sensor are arranged above the lime kiln flue gas nozzles and the clear water flushing nozzles.

Furthermore, a pressure sensor is arranged near the exhaust port.

Furthermore, a filter screen with the aperture of 1 mm is arranged at the bottom of the reaction chamber.

Furthermore, a discharge valve is arranged below the filter screen, a three-way valve is equipped below the discharge valve, and the three-way valve respectively communicates with the reaction chamber, a solid channel and a liquid channel.

Furthermore, the body structure of the acidification and carbonization coupling reaction unit is made of stainless steel, and a wear-resisting lining plate is attached to the position, which makes contact with the steel slag, of the interior of the reaction chamber.

After the acidification and carbonization coupling reaction is finished, first, most of liquid in the reaction unit is filtered through the filter screen and is discharged into the liquid storage tank through the liquid channel, i.e. the solid containing suspension; and then the steel slag is flushed with clear water in the clear water flushing nozzles, chemical agents attached to the steel slag particles are washed out, and liquid enters the storage tank. Then the three-way valve is turned to the other side, a filter screen valve at the bottom of the reaction chamber is opened, and the steel slag falls into the solid channel and is conveyed to the storage yard for standby application through a belt.

In one or more of implementations of the present invention, the liquid-solid separation unit includes a liquid storage tank, a liquid uniform distributor, a discharge nozzle and sealing cover, a vacuum filter and a liquid recycling pipeline.

The solid containing suspension which is treated by the acidification and carbonization coupling reaction unit is stored in the liquid storage tank, is pretreated through the liquid uniform distributor and then enters the vacuum filter to be filtered through the discharge nozzle, so that solid-liquid separation is achieved, separated liquid is collected from the liquid recycling pipeline, the liquid collected from the liquid recycling pipeline is pumped into the liquid storage tank of the distillation separation unit for standby application, and solid is conveyed to the storage yard for standby application.

In one or more of implementations of the present invention, the distillation separation unit includes a distillation chamber, and a liquid feed port and an exhaust port are formed in the upper end of the distillation chamber; and an acetic acid separation chamber, an ethanolamine separation chamber and a tributyl phosphate separation chamber are sequentially arranged in the distillation chamber from top to bottom, and corresponding liquid storage devices are respectively arranged at the bottoms of the separation chambers and are used for directly feeding the acetic acid feed port, the tributyl phosphate feed port and the ethanolamine feed port of the acidification and carbonization coupling reaction unit.

The acetic acid separation chamber, the ethanolamine separation chamber and the tributyl phosphate separation chamber are separated and communicate with each other through pipelines.

The exhaust port is connected with condensate water recycling equipment, and recycled condensate water is used for cleaning steel slag and the acidification and carbonization coupling reaction.

A drainage and circulation device is arranged at the bottom of the distillation chamber and communicates with a feed device of the distillation separation column.

Steam is used as a heat source in the distillation process, the steam is generated by a waste heat boiler in the steel slag treatment process, or is generated by a waste heat boiler of a lime rotary kiln or is generated in other process links, and the steam temperature is required to be higher than or equal to 350° C.

The fourth aspect of the present invention provides an application of the modified steel slag to preparing asphalt and concrete aggregates and blending materials for various building materials.

In order to enable those skilled in the art to understand the technical solutions of the present invention more clearly, the technical solutions of the present invention will be described in detail below with reference to specific embodiments.

A process for modifying steel slag through acidification and carbonization coupling:

Steel slag particles enter an acidification and carbonization coupling reaction unit through a belt or a bucket conveyor, first, water is added, a spiral stirrer is started, then acetic acid solid is added, the concentration of acetic acid is controlled to be 5% to 20% and is adjusted according to the contents of particles and f-CaO of to-be-treated steel slag, the steel slag is continuously added in batches, and the reaction time is controlled to be 20-60 min. The PH value of liquid in a tank is measured by using a PH measuring instrument inserted into a reactor, then lime kiln flue gas containing $CO_2$ gas is introduced, tributyl phosphate is added in batches, and the final total amount is the same as the molar mass of the acetic acid. A NaOH and $Ca(OH)_2$ emulsion is added, the PH value of the liquid is adjusted between 8 and 11, ethanolamine is added in batches, the solubility of the $CO_2$ gas in the ethanolamine is 8.5 times that in a water solution, therefore, the solubility of the $CO_2$ gas is increased by adding the ethanolamine, the carbonation reaction is intensified, the total amount of the ethanolamine is controlled to be 5% to 20%, the carbonation reaction occurs, the time is controlled to be 15-30 min, the gas pressure in the tank is controlled to be 0.1-2 MPa, the reaction temperature is 25-100° C., after the set reaction time is reached, a matched fan in the reaction unit is turned on to exhaust, the liquid in the reaction unit is discharged, the steel slag is cleaned with circulating water distilled to separate chemical agents, and the steel slag is discharged to a storage yard for standby application.

A solid containing suspension enters a liquid-solid separation unit, solid particles are separated from liquid through vacuum filter equipment, separated solid is cleaned through nozzles on the upper part of the filter, and liquid enters the storage tank and a distillation separation unit.

The liquid is conveyed to a feed device of the distillation separation unit through a pump and a pipeline, steam which is generated by a waste heat boiler in the steel slag treatment process, or is generated by a tail gas waste heat boiler of a lime kiln or is generated by other sources is used, the steam temperature is required to be higher than or equal to 350° C., the boiling point of the acetic acid is 117.9° C., the boiling point of the ethanolamine is 170.9° C., the boiling point of the tributyl phosphate is 288.28° C., according to different boiling points of three chemical substances, the three chemical substances are separated by a distillation separation column and then are recycled, the treatment cost of the technique is reduced, the problem of environmental pollution is solved, and water is recycled through condensate water recycling device for cyclic utilization.

Further description is given below with reference to the specific accompanying drawings:

Embodiment 1

Figure 2:
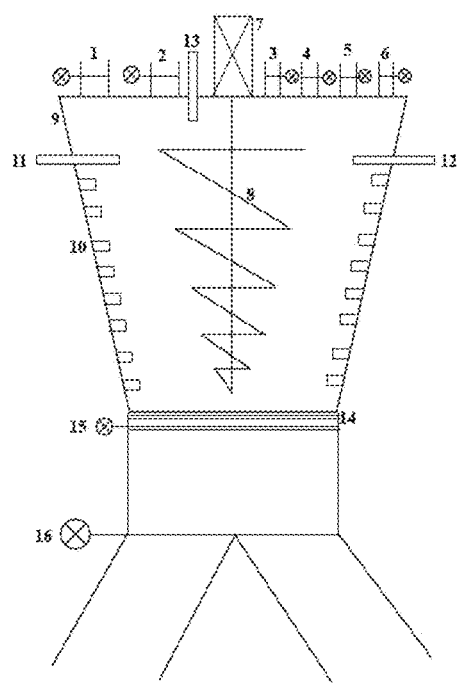
FIG. 2 is a diagram of the acidification and carbonization coupling unit provided in the present invention: 1 represents a steel slag feed port, 2 represents an exhaust port, 3 represents an acetic acid feed port, 4 represents a tributyl phosphate feed port, 5 represents an ethanolamine feed port, 6 represents a NaOH and $Ca(OH)_2$ emulsion feed port, 7 represents a motor, 8 represents a stirring shaft with spiral blades, 9 represents a reaction chamber, 10 represents uniformly distributed lime kiln flue gas nozzles and clear water flushing nozzles, 11 represents a PH sensor, 12 represents a temperature sensor, 13 represents a pressure sensor, 14 represents a filter screen with the aperture of 1 mm, 15 represents a discharge valve, and 16 represents a three-way valve.

A process for modifying steel slag through acidification and carbonization coupling:

(1) Steel slag particles are conveyed to enter an acidification and carbonization coupling reaction unit, and equipment numbers are shown in FIG. 2. The steel slag particles enter a reaction chamber 9 through a steel slag feed port 1, circulating water is added to the reaction unit through a NaOH and $Ca(OH)_2$ emulsion feed port 6, the liquid-solid ratio is set to 5:1, the water amount is controlled, a motor 7 is started to drive a stirring shaft 8 with spiral blades to move, acetic acid solid is added in batches through an acetic acid feed port 3, mixing and reaction are performed for 20 min, then tributyl phosphate is added through a tributyl phosphate feed port 4, meanwhile, lime kiln flue gas containing $CO_2$ is sprayed through lime kiln flue gas nozzles 10, the flue gas pressure is controlled to be 0.1 MPa, ethanolamine (5%) is added in batches through an ethanolamine feed port 5, the solubility of $CO_2$ is increased, a NaOH and $Ca(OH)_2$ emulsion is added through a NaOH and $Ca(OH)_2$ emulsion feed port 6, the PH value of the carbonation reaction is adjusted, after the reaction is finished, filtering through a filter screen 14 is performed, a discharge valve 15 and a three-way valve 16 are opened, the steel slag particles of 1 mm are separated from a solid containing suspension, and when water is drained, steel slag is cleaned with clean circulating water in the reaction chamber and then is conveyed to a storage yard for standby application.

Figure 3:
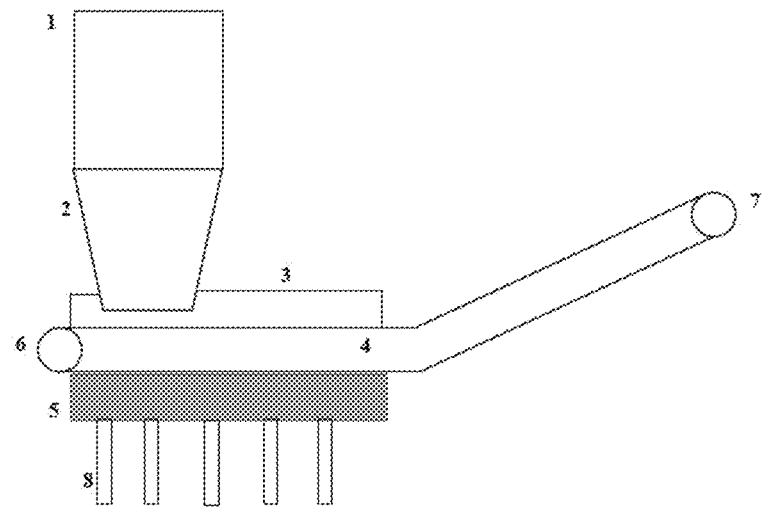
FIG. 3 is a diagram of the liquid-solid separation unit provided in the present invention: 1 represents a liquid storage tank, 2 represents a liquid uniform distributor, 3 represents a discharge nozzle and sealing cover, 4 represents filter cloth matched with a vacuum filter, 5 represents a suction nozzle matched with the vacuum filter, 6 represents a tail wheel of a conveying belt matched with the vacuum filter, 7 represents a head wheel of the conveying belt matched with the vacuum filter, and 8 represents liquid recycling pipelines and storage equipment.

(2) As shown in FIG. 3, the solid containing suspension enters a liquid storage tank 1 of a liquid-solid separation unit, the solid containing suspension is uniformly shunted and distributed through a liquid uniform distributor 2 and a discharge nozzle 3 and then enters a vacuum filter, liquid uniformly falls onto filter cloth 4 matched with the vacuum filter, solid and liquid with a low solid content are separated through vacuum suction of a suction nozzle 5, the solid is further cleaned through cleaning nozzles arranged in the discharge nozzle 3 and then is conveyed to the storage yard for standby application through a tail wheel 6 and a head wheel 7, and the liquid is conveyed into the storage tank after being collected through a liquid recycling pipeline 8 and enters a distillation separation unit.

Figure 4:
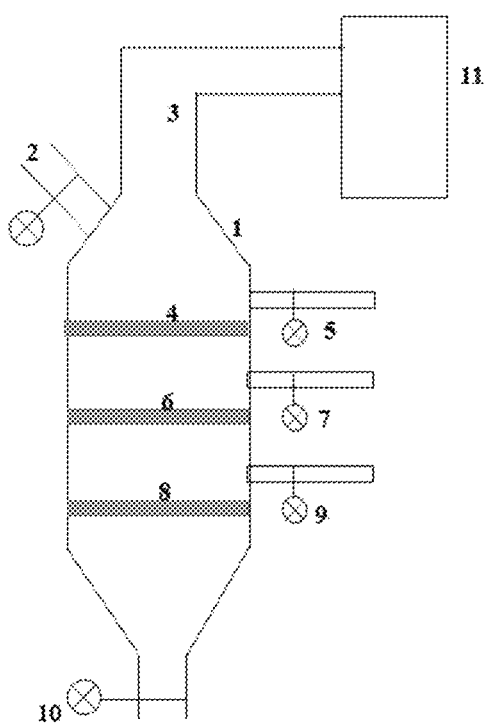
FIG. 4 is a diagram of the distillation separation unit provided in the present invention: 1 represents a distillation chamber, 2 represents a liquid feed port, 3 represents an exhaust port after distillation, 4 represents an acetic acid separation chamber, 5 represents an acetic acid feed and storage device, 6 represents an ethanolamine separation chamber, 7 represents an ethanolamine feed and storage device, 8 represents a tributyl phosphate separation chamber, 9 represents a tributyl phosphate feed and storage device, 10 represents a bottom drainage and circulation device, and 11 represents condensate water recycling equipment.

(3) As shown in FIG. 4, the liquid enters a distillation chamber 1 of the distillation separation unit through a feed port 2, an acetic acid separation chamber 4, an ethanolamine separation chamber 6 and a tributyl phosphate separation chamber 8 are heated by using steam, the temperatures are respectively controlled to be 288.28° C., 170.9° C. and 117.9° C., collection is performed through an acetic acid feed and storage device 5, an ethanolamine feed and storage device 7 and a tributyl phosphate feed and storage device 9, tributyl phosphate, ethanolamine and acetic acid are separated and separately collected, the remaining water-rich steam enters condensate water recycling equipment 11 through an exhaust port 3, and recycled condensate water from the steam is 100% recycled without discharge or pollution.

Embodiment 2

A process for modifying steel slag through acidification and carbonization coupling:

(1) Steel slag particles are conveyed to enter an acidification and carbonization coupling reaction unit, and equipment numbers are shown in FIG. 2. The steel slag particles enters a reaction chamber 9 through a steel slag feed port 1, circulating water is added to the reaction unit through a NaOH and Ca(OH)$_2$ emulsion feed port 6, the liquid-solid ratio is set to 20:1, the water amount is controlled, a motor 7 is started to drive a stirring shaft 8 with spiral blades to move, acetic acid solid is added in batches through an acetic acid feed port 3, mixing and reaction are performed for 60 min, then tributyl phosphate is added through a tributyl phosphate feed port 4, meanwhile, lime kiln flue gas containing CO$_2$ is sprayed through lime kiln flue gas nozzles 10, the flue gas pressure is controlled to be 2 MPa, ethanolamine (20%) is added in batches through an ethanolamine feed port 5, the solubility of CO$_2$ is increased, a NaOH and Ca(OH)$_2$ emulsion is added through a NaOH and Ca(OH)$_2$ emulsion feed port 6, the PH value of the carbonation reaction is adjusted, after the reaction is finished, filtering through a filter screen 14 is performed, a discharge valve 15 and a three-way valve 16 are opened, the steel slag particles of 1 mm are separated from a solid containing suspension, and when water is drained, steel slag is cleaned with clean circulating water in the reaction chamber and then is conveyed to a storage yard for standby application.

(2) As shown in FIG. 3, the solid containing suspension enters a liquid storage tank 1 of a liquid-solid separation unit, the solid containing suspension is uniformly shunted and distributed through a liquid uniform distributor 2 and a discharge nozzle 3 and then enters a vacuum filter, liquid uniformly falls onto filter cloth 4 matched with the vacuum filter, solid and liquid with a low solid content are separated through vacuum suction of a suction nozzle 5, the solid is further cleaned through cleaning nozzles arranged in the discharge nozzle 3 and then is conveyed to the storage yard for standby application through a tail wheel 6 and a head wheel 7, and the liquid is conveyed into the storage tank after being collected through a liquid recycling pipeline 8 and enters a distillation separation unit.

(3) As shown in FIG. 4, the liquid enters a distillation chamber 1 of the distillation separation unit through a feed port 2, an acetic acid separation chamber 4, an ethanolamine separation chamber 6 and a tributyl phosphate separation chamber 8 are heated by using steam, the temperatures are respectively controlled to be 288.28° C., 170.9° C. and 117.9° C., collection is performed through an acetic acid feed and storage device 5, an ethanolamine feed and storage device 7 and a tributyl phosphate feed and storage device 9, tributyl phosphate, ethanolamine and acetic acid are separated and separately collected, the remaining water-rich steam enters condensate water recycling equipment 11 through an exhaust port 3, and recycled condensate water from the steam is 100% recycled without discharge or pollution.

The foregoing descriptions are merely preferred embodiments of the present invention and are not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. A process for modifying steel slag through acidification and carbonization coupling, wherein acetic acid, tributyl phosphate, ethanolamine and a NaOH and Ca(OH)$_2$ emulsion are used as reaction reinforcing agents, and the steel slag is modified together with CO$_2$-rich lime kiln flue gas;

the process for modifying the steel slag through acidification and carbonization coupling specifically comprises the steps of sequentially adding water and acetic acid solid to the steel slag, mixing and reacting for 20-60 min, then introducing the lime kiln flue gas containing CO$_2$ gas, and meanwhile, and adding the tributyl phosphate, the NaOH and Ca(OH)$_2$ emulsion and the ethanolamine for acidification and carbonization coupling reaction;

when the water and the acetic acid solid are sequentially added to the steel slag, the water amount is controlled according to the liquid-solid ratio of 20:1 to 5:1, and the concentration of the acetic acid is controlled to be 5% to 20%;

the final total amount of the tributyl phosphate is the same as the molar mass of the added acetic acid;

the amount of the NaOH and Ca(OH)$_2$ emulsion is required to adjust the pH value of liquid between 8 and 11; and the amount of the ethanolamine is 5% to 20%.

2. The process for modifying the steel slag through acidification and carbonization coupling according to claim 1, wherein the acidification and carbonization coupling reaction time is controlled to be 15-30 min.

3. The process for modifying the steel slag through acidification and carbonization coupling according to claim 1, wherein the flue gas pressure is controlled to be 0.1-2 MPa.

4. The process for modifying the steel slag through acidification and carbonization coupling according to claim 1, wherein the reaction temperature is 25-100° C.

* * * * *